United States Patent [19]

Liddle et al.

[11] 4,145,875

[45] Mar. 27, 1979

[54] VARIABLE FLOW CAPACITY GAS TURBINE ENGINE FOR IMPROVED PART LOAD FUEL ECONOMY

[75] Inventors: Sidney G. Liddle, Sterling Heights; Mason K. Yu, Birmingham, both of Mich.

[73] Assignee: General Motors Corporation, Detroit, Mich.

[21] Appl. No.: 732,814

[22] Filed: Oct. 15, 1976

[51] Int. Cl.² ............................. F02C 9/04; F02C 9/02
[52] U.S. Cl. .................................... 60/39.03; 60/39.25
[58] Field of Search ........................... 60/39.03, 39.25; 180/66 A, 105

[56] References Cited

U.S. PATENT DOCUMENTS

| 3,025,668 | 3/1962 | Mock | 60/39.25 |
| 3,255,586 | 6/1966 | Hennig | 60/39.03 |
| 3,797,230 | 3/1974 | Amann | 60/39.03 |
| 3,899,886 | 8/1975 | Swick | 60/39.25 |
| 3,981,140 | 9/1976 | Lunsford | 60/39.03 |

Primary Examiner—Louis J. Casaregola
Attorney, Agent, or Firm—J. C. Evans

[57] ABSTRACT

A gas turbine engine includes a compressor having a plurality of fixed diffuser passages therein each including a gate and associated cam ring control means for operating each of the gates either open or closed to vary the gas flow through the compressor diffuser for turbine engine control; the gas turbine engine further includes a turbine section having a plurality of turbine nozzle passages each having a separate gate therein selectively operated under the control of cam ring means to vary the amount of motive fluid to the turbine in accordance with desired engine operation and wherein each of the gates are operative with respect to either the diffuser or the nozzle passages to change the area of gas flow therethrough by blocking some or all of the channels without resultant change in incident angle of the gas flow with respect to the inlet of each of the passages.

2 Claims, 10 Drawing Figures

VARIABLE FLOW CAPACITY GAS TURBINE ENGINE FOR IMPROVED PART LOAD FUEL ECONOMY

This invention relates to gas turbine engine controls and more particularly to variable geometry control arrangements for varying the amount of gas flow to a gas turbine engine so as to improve its part load operating characteristics.

In various gas turbine engines one consideration is fuel economy under part load conditions. Because of duty cycle in most motor vehicles, the greater times of driving are at relatively low power levels. In order to improve fuel economy in gas turbine engines, it is necessary to regulate the engine performance so as to reduce fuel consumption at low power levels of operation without incurring as flow penalties at higher power levels of turbine engine operation.

One approach to obtaining such flexibility in gas turbine engines is by the provision of a split compressor engine of the type set forth in U.S. Pat. No. 3,625,003 issued Dec. 7, 1971, to S. G. Liddle et al. In this arrangement, a combination of two smaller gas turbine engines are operated separately or jointly to provide both good economy and performance at various power levels of operation.

Various other proposals have been suggested to regulate the amount of gas flow through rotary engine devices so as to affect the performance thereof. One such proposal is shown in U.S. Pat. No. 3,270,495 issued to D. H. Connor, Sept. 6, 1966, wherein a poppet type valve 30 is operated so as to regulate the total amount of gas flow through the turbocharger in accordance with engine operating conditions.

In U.S. Pat. No. 2,739,782, issued Mar. 27, 1956, to J. S. White, a variable area turbine nozzle assembly is disclosed wherein a control ring is moved axially with respect to the inlet tip of a turbine nozzle so as to regulate the amount of motive fluid through the radial flow type impeller of the turbine so as to control the efficiency thereof under different operating modes. In this arrangement the ring is continuously formed and defines a variably located abrupt edge to interfere with mass flow through the turbine nozzle. Moreover, the arrangement does not suggest control of gas turbine engines so as to maximize fuel economy.

Another example of variable geometry control means for regulating the mass flow conditions through a compressor is set forth in U.S. Pat. No. 3,426,964 issued Feb. 11, 1969, to D. H. Silvern. In this arrangement, a flow area in the compressor diffuser is regulated by movement of an annular piston 23. While the arrangement suggests a configuration for varying the flow area through a diffuser it again defines a variably positioned abrupt edge in the diffuser passage to interfere with the flow of compressor discharge through the diffuser.

Arrangements for varying mass flow through a gas turbine power plant or engine are also set forth in U.S. Pat. No. 3,138,923 issued June 30, 1964, to Kronogard and U.S. Pat. No. 3,025,668 issued Mar. 20, 1962, to F. C. Mock. In these arrangements, the variable geometry control means are in the form of vanes that are angularly positioned so as to change the incident angle of gas flow with respect to either diffuser passages or nozzle passages of the machine which under some modes produces a loss in efficiency.

It is also known, as shown in U.S. Pat. No. 3,561,216, issued Feb. 9, 1971, to Moore, Jr., to selectively direct steam to arcuate segments of a turbine nozzle assembly. Such arrangements are operated so as to regulate the thermal stress conditions within the gas turbine and require exteriorly located steam chests or plenums with separately operated poppet type control valves and actuators all located exteriorly of the steam turbine apparatus proper.

Accordingly, an object of the present invention is to improve the rate of gas flow in turbine engines, turbochargers or superchargers by the provision of individual gate elements reciprocally mounted to open and close separate divergent diffuser passages for centrifugal compressors or radial inflow turbine nozzle assemblies wherein each of a plurality of circumferentially spaced individual passages has a separate gate therein supported on a control rod operated to shift the gate between fully open and closed positions wherein a part of circumferential gas flow through either a diffuser or turbine nozzle is interrupted without locating an abrupt edge in the flow path and without changing the incident angle of gas flow from the centrifugal compressor into the diffuser passageways and/or without changing the incident angle of gas flow from the radial inflow turbine nozzle passages against a radial inflow turbine associated therewith.

Still another object of the present invention is to provide an improved control for gas turbine engines including means for reducing flow area through the compressor diffuser and nozzle passages of centrifugal compressor and radial inflow turbine components, respectively, of a gas turbine engine and to reduce the area to at least 10% of the full open design area without placing an abrupt flow area control edge in the passages and without changing the incident area or flow characteristics of the individual diffuser and/or turbine passages of the gas turbine engine and thereby improve the fuel economy characteristics of the gas turbine engine by materially reducing fuel consumption at low power levels of operation thereof.

Still another object of the present invention is to improve fuel operating characteristics of a gas turbine engine of the type including a centrifugal compressor and a radial inflow turbine by the provision of a diffuser in association with a compressor including a plurality of separate, circumferentially spaced diffuser passages therein each including an individual, selectively operated, control gate therein and further including a radial inflow turbine nozzle associated with the radial inflow turbine including a plurality of separate, circumferentially spaced passages each having an individual control gate therein selectively operated to vary gas flow through the turbine nozzle without changing the flow characteristics of each of the individual control passages through the turbine nozzle and wherein the diffuser and turbine nozzle control gates are coupled such that the air flow through the engine is reduced while engine speed and pressure ratios across the compressor diffuser and turbine nozzles are maintained and to do so by reducing the flow area of the diffuser passages and the turbine nozzles while maintaining a desired range of power level operation.

Yet another object of the present invention is to provide a variable flow capacity gas turbine engine including a centrifugal compressor having a variable flow capacity diffuser and a radial inflow gas turbine associated with a power turbine nozzle wherein each of the diffuser and turbine nozzles include a plurality of equidistantly spaced, like radially formed passages each including an individual flow control gate therein selectively operated to reduce the air flow through the engine while maintaining engine speed and pressure ratios across both the compressors and turbine nozzle assembly and wherein each of the individual gates are associated with a controller in the form of circular cam assembly including first and second rings one of which pushes a preselected plurality of the gates fully closed in the passages and the other of which lifts a preselected number of each of the gates into a fully open position in which case all gas flow through either the diffuser or the turbine nozzle passages is directed through like inlet and discharge configurations in each of the individual passages without change of incident angle of gas flow into the diffuser passages or out of the turbine nozzle passages and without abrupt gas flow interruptions at either the entrance or the exit of the individual passages; and to control engine operation continuously through a first mode where the total area of gas flow through both the diffuser and turbine nozzle passages is held constant at about 10% of the total area of flow through the diffuser and nozzles while engine speed is varied about 60% to 80% of the design speed as the car speed is accelerated from zero up to twenty miles per hour; and in a second mode wherein at car speed ranges of from twenty miles per hour to eighty miles per hour the engine speed is held constant at 80% of design speed and the flow area is increased directly as a function of car speed increase between twenty to eighty miles per hour and wherein at eighty miles per hour the flow area through the diffuser and nozzle passages is at a desired maximum; and in a third mode wherein engine speed is increased as car speed increases above eighty miles per hour up to a predetermined maximum car speed and to effect the continuous change in diffuser and nozzle flow area in stepped increments by selectively opening and closing individual ones of the gate in either the diffuser and/or turbine nozzle passages.

Further objects and advantages of the present invention will be apparent from the following description, reference being had to the accompanying drawings wherein a preferred embodiment of the present invention is clearly shown.

Figure 1:
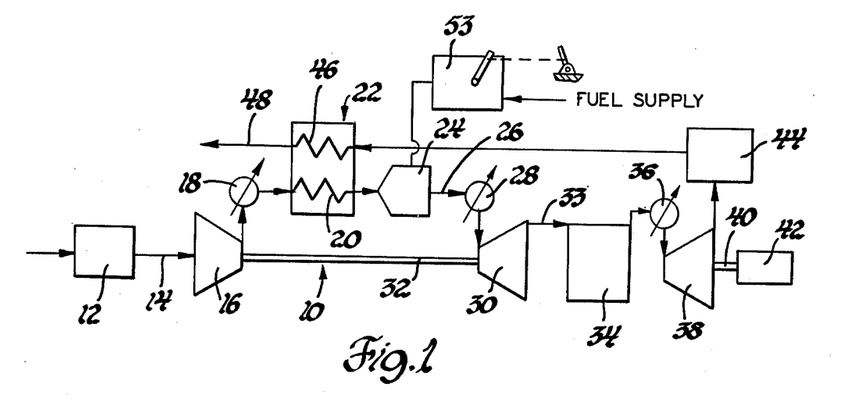
FIG. 1 is a schematic representation of a gas turbine engine including the variable flow controls of the present invention.

Referring now to the drawing, FIG. 1 schematically illustrates a gas turbine engine 10 including an inlet air cleaner 12 for receiving ambient air upstream of an inlet conduit 14 to a compressor 16 of the centrifugal type having a variable flow capacity diffuser 18 constructed in accordance with the present invention that receives discharge air from the compressor 16.

Variable flow capacity diffuser 18 discharges through a pass 20 of an exchanger 22 for supplying heated inlet air through a burner assembly 24 in which fuel and air are burned to produce combustion products for discharge through a conduit 26 thence through a variable flow capacity turbine nozzle assembly 28 in the inlet to a radial inflow type turbine 30. The turbine 30 has a drive shaft 32 therefrom coupled to the compressor 16 for driving it to provide compressed air flow for engine operation. In the illustrated arrangement exhaust from the turbine 30 passes through a duct 33 to the inlet of an interstage diffuser 34 having its outlet in communication with a variable flow capacity nozzle assembly 36 corresponding to the nozzle assembly 28. The assembly 36 is in the inlet to a second radial inflow power turbine 38 having an output shaft 40 connected to a driven load 42 such as transmission and power train for driving the wheels of a vehicle. Exhaust from the turbine 38 is directed through a power turbine diffuser stage 44 thence through a parallel pass 46 of the exchanger 22 for heating air flow through the pass 20 prior to exhaust discharge through an outlet 48 to atmosphere.

The main features of the aforedescribed engine 10 is the provision of a variable flow capacity diffuser 18 coupled operatively with variable capacity gasifier and power turbine nozzle assemblies 28, 36. While the FIG. 1 schematic shows a dual shaft turbine engine, the concepts of the present invention are equally applicable to a single shaft turbine engine wherein part of the output power from a single turbine is utilized for direct drive of a vehicle while another part of its output power produces drive of a gasifier compressor.

In accordance with the present invention the variable flow capacity of the diffuser 18 and the variable flow capacity turbine nozzles 28, 36 are coupled such that the total air flow through the engine is reduced under certain operating modes while engine speed and pressure ratios are maintained. More particularly, by the use of a system as shown schematically in FIG. 1 improved part load fuel economy is obtained by matching the air flow through the gas turbine engine 10 in accordance with the duty cycle of a vehicle. In accordance with the present invention the control of the air flow area through the engine is maintained at a substantially reduced level under low power levels of operation without incurring severe penalties of engine operation at higher power levels as required occasionally under a normal driving cycle of operation.

Figure 2:
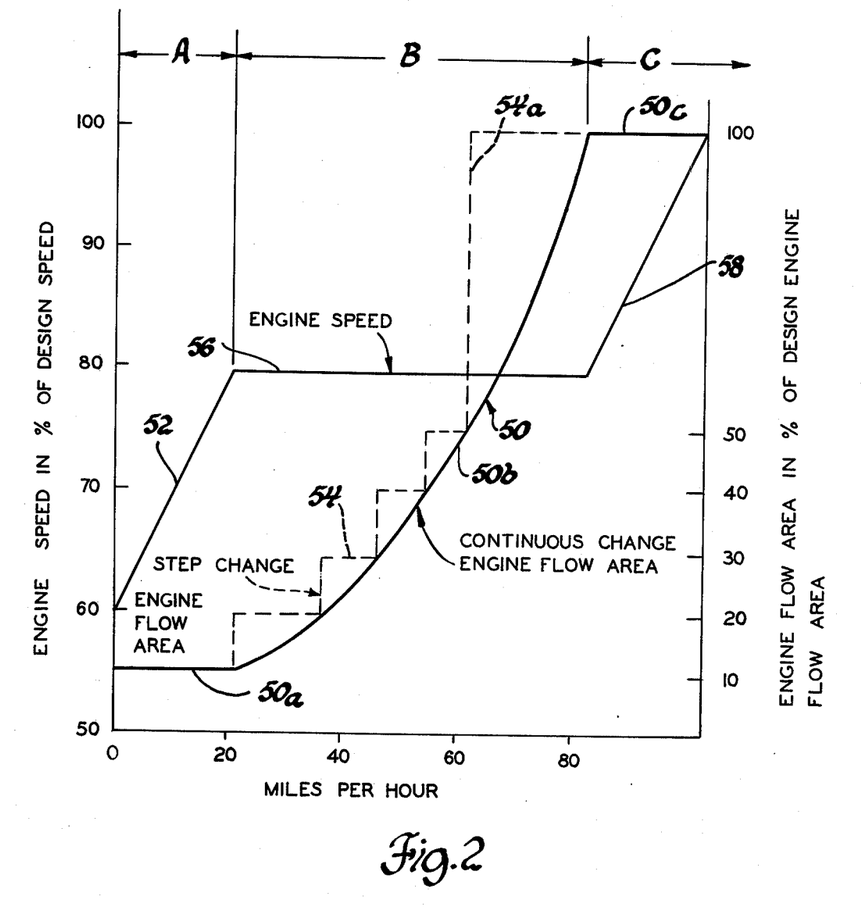
FIG. 2 is a chart of engine control modes produced by the flow area control of the present invention.

One method of controlling air flow in the engine is shown in FIG. 2. The flow area control of the variable flow capacity diffuser 18 is coupled to the flow area control through the variable flow capacity turbine nozzle assemblies 28 and 36 as will be described to produce the mode of control shown in FIG. 2. In the chart shown in FIG. 2 the ordinate is the speed of operation of the shaft 32 referred to as engine speed and is in percent of a preselected maximum design speed. The abcissa is the vehicle speed in miles per hour and the right hand ordinate of the chart is the flow area through the variable area flow capacity diffuser 18 and the variable flow capacity turbine nozzle assemblies 28, 36 in percentage of the total open engine flow area through the aforesaid regions of flow in the gas turbine engine 10.

The graph includes a first curve 50 representing a constant engine flow area at a curve segment 50a between zero and 20 miles of vehicle speed; a curve segment 50b representing an area wherein air flow area through the diffuser 18 and variable flow capacity nozzles 28, 36 continuously varies in accordance with vehicle speed between twenty miles per hour and eighty miles per hour; and including an upper flat curved portion 50c representing a constant engine flow area at vehicle speeds between eighty miles per hour and a predetermined maximum vehicle speed of operation. For the engine 10 illustrated in FIG. 1 the flow area through the coupled, variable flow capacity diffuser 18 and variable flow capacity nozzles 28, 36 is maintained at approximately 10% (region 50a) of their full open flow area and engine speed varies from 60% to 80% of its full design speed as shown by curve 52 as the vehicle speed increases from zero to twenty miles per hour. In order to accelerate the drive speed of the shaft 32, fuel is added by known means such as power demand responsive fuel control means 53 shown in U.S. Pat. No. 3,921,390 issued Nov. 25, 1975 to Donald D. Stoltman so as to increase the turbine inlet temperature of the gasifier turbine 30 as well as the turbine inlet temperature of the power turbine 38. The increased fuel supply to the burner assembly 24 and the resultant increase in speed of the engine as shown in curve 52 supplies power requirements to accelerate a vehicle between zero and twenty miles per hour. The power change is accomplished with a minimum air flow through the engine and since a fuel control of the aforesaid type maintains a substantially constant air/fuel ratio, fuel economy during vehicle acceleration from zero to twenty miles per hour is maximized.

The vehicle speed range of from twenty miles per hour to eighty miles per hour is an engine operating mode referred to as a part load mode of operation. In this mode the air flow through the engine is established under the control of the variable flow capacity diffuser 18 and variable flow capacity nozzles 28, 36 to produce a step change as shown by the dotted part load curve 54 in FIG. 2 to closely approximate a desired continuous change in engine flow area as represented by the curve 50b. In the vehicle speed range from twenty to eighty miles per hour the engine speed is maintained constant as shown by the curve segment 56 at approximately 80% of the full design speed of the engine. The flow area is increased in the step fashion illustrated by the part load curve 54 directly as a function of car speed between twenty and eighty miles per hour. Such step changes approximate the smooth curve segment 50b and it is therefore possible to hold the turbine inlet temperature substantially constant and allow the engine speed to vary so as to obtain power changes required to operate the car at the different vehicle speeds of operation. It may be desirable in some cases to further control the turbine inlet temperature, by change of fuel supply to the burner assembly 24 and as well as engine speed to obtain fully optimized engine performance.

In the illustrated arrangement, at vehicle speeds above eighty miles per hour, the engine speed is increased from approximately 80% of fuel design speed to 100% of full design speed as shown by curve segment 58 and this is accomplished by a step change in flow area from the 50% open area as shown to a full open area which is shown by the abrupt increase at curve segment 54a representing change in flow area through the variable flow capacity diffuser 18 and variable flow capacity nozzles 28, 36. The abrupt change in gas flow area will produce a resultant increase in fuel flow to maintain air/fuel ratio so as to increase the turbine inlet temperature with a resultant rapid increase in power supply to meet the requirements of further increases in vehicle speed.

Thus, speed operation in a region A as shown in FIG. 2 can be characterized as one wherein engine speed is variable and gas flow area through the engine is constant and preferably in the range of approximately 10% of a resultant full open design flow area. Region B (FIG. 2) of engine operation can be characterized as one of constant engine speed with a continually stepwise variable change in gas flow area through the engine. And region C can be chracterized as an engine operating mode having a variable engine speed with a constant gas flow area therethrough of 100% of the total flow area through variable flow capacity diffuser 18 and the variable flow capacity nozzle assemblies 28, 36.

In accordance with the present invention, a variable area compressor diffuser 18 is operated to reduce air flow area through the diffuser to at least 10% of the total open flow area therethrough and variable area turbine nozzle assemblies 28, 36 have their area changed at the same time as the area through the variable diffuser changes in accordance with the vehicle power demand as represented by positioning of a vehicle accelerator to increase or decrease fuel flow to the combustor 24 under the control of the fuel control means 53.

More particularly, to obtain the engine operating mode as shown in FIG. 2, the present invention contemplates a unique arrangement of flow control gates especially suited for use with radial flow, rotary gas turbine engine components such as centrifugal compressor impellers and radial inflow type turbine impellers.

Figure 3:
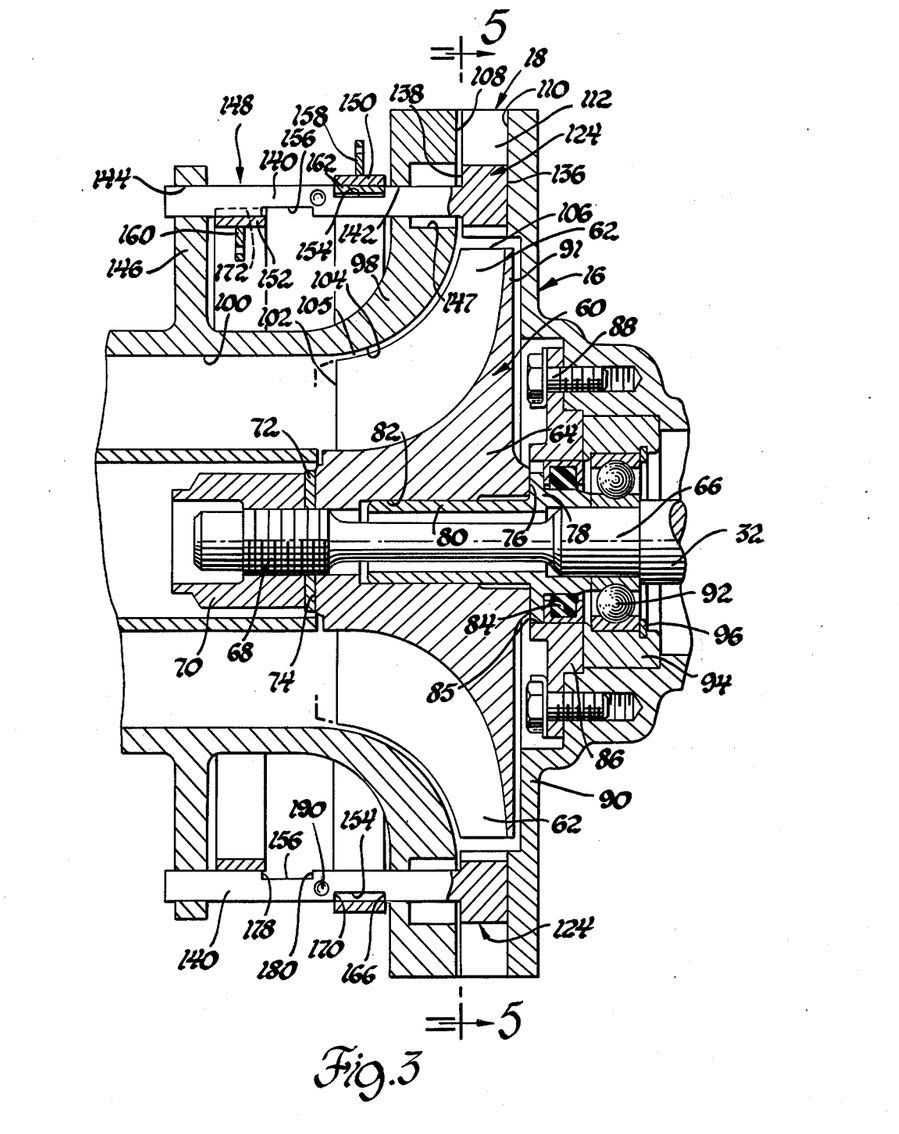
FIG. 3 is a vertical sectional view taken along the axis of a centrifugal compressor and compressor diffuser in the present invention.

More particularly, referring to FIG. 3, the compressor 16 is illustrated as including a centrifugal impeller 60 having a plurality of circumferentially spaced impeller blades 62 thereon and a hub 64 secured to a portion 66 of the gasifier turbine shaft 32 having an outboard threaded end 68 for threadably receiving a retainer nut 70 that is held against a lock washer 72 in interlocking engagement with the outboard end 74 of the impeller 60. The inboard end 76 of the impeller 60 is held against the flange 78 of a bushing 80 press fit into an internal bore 82 through the hub 64.

Flange 78 locates a seal assembly 84 for sealing an opening 85 in a seal and bearing cover 86 secured by suitable fastening means shown as screws 88 to a rear wall 90 located in spaced relationship to the back plate 91 of the impeller hub 64.

In the illustrated arrangement the impeller shaft is rotatably supported with respect to the rear wall 90 by means of a bearing assembly 92 retained in place within a bearing housing 94 by means of a snap ring 96. The outer radial tips of each of the blades 62 are covered by a shroud 98 that defines an axial inlet 100 of annular configuration leading to the inlet 102 of each of the blades. The shroud 98 includes a radially curved annular inner surface 104 that cooperates with the rear wall 90 to define a pump chamber 105 in which the impeller 60 is driven by the shaft 32 so as to draw ambient air through the air cleaner 12 for flow through the axial inlet 100 thence for discharge through the radially outer circumference 106 of the impeller 62.

In accordance with the present invention the variable flow capacity diffuser 18 is an annular ring located radially outwardly of the outer circumference 106. It includes an outboard cover in the form of an inner surface extension 108 on the outer shroud 98 and a rear reference in the form of a surface 110 on the rear wall 90 at a point radially outwardly of the outer circumference 106. The diffuser 18 further includes a plurality of circumferentially spaced, wedge shaped stationary vanes 112, each including an inlet tip 114 and an arcuate, radially outwardly end segment 116 thereon so as to define a divergent flow passage 118 having an inlet 120 at the outer circumference 106 of the impeller 60 and an outlet 122 in communication with a chamber (not shown) for communicating diffused compressor discharge air into the parallel path 20 of the regenerator 22 as shown in FIG. 1.

Figure 5:
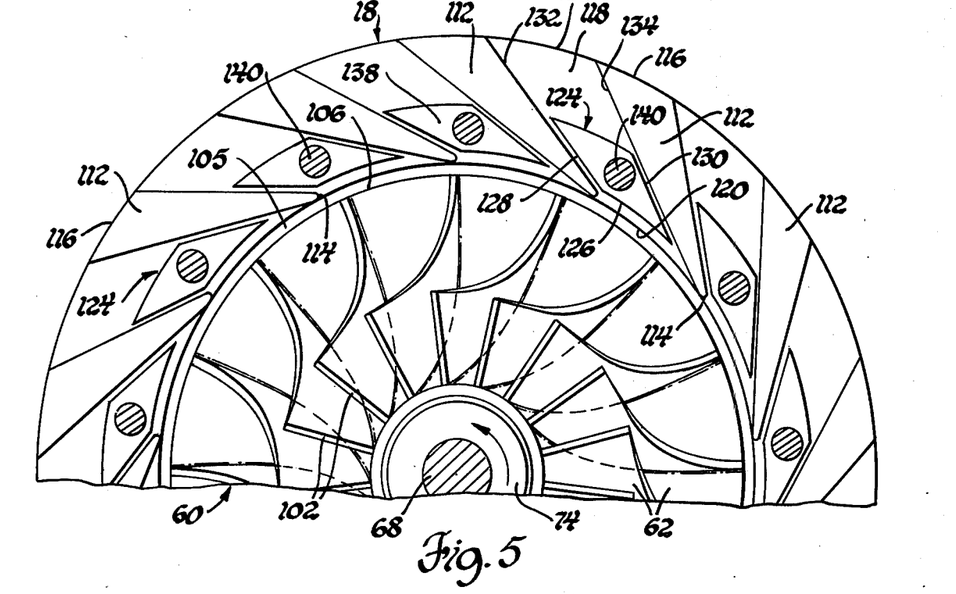
FIG. 5 is a fragmentary vertical sectional view taken along the line 5—5 of FIG. 3 looking in the direction of the arrows.
Figure 6:
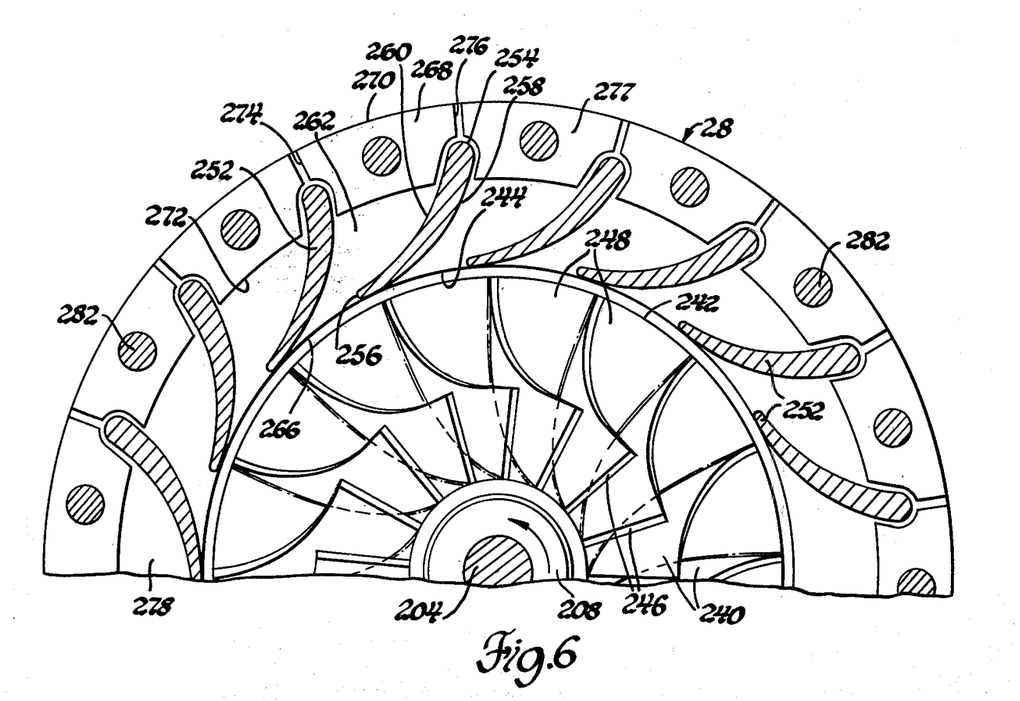
FIG. 6 is a fragmentary vertical sectional view taken along the line 6—6 of FIG. 4 looking in the direction of the arrows.
Figure 7:
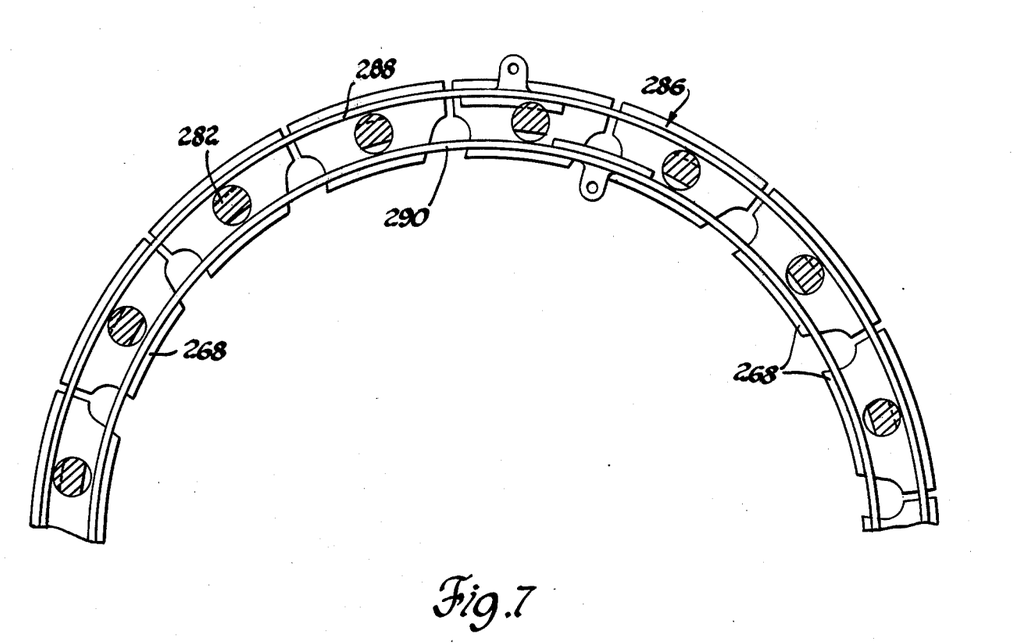
FIG. 7 is a fragmentary sectional view of a control rod and ring cam mechanism for controlling air flow through the turbine nozzle assembly in FIG. 5.

In accordance with the present invention, each of the divergent flow diffuser passages 118 includes an individual gate element 124. As shown in FIG. 5, each of the gate control elements 124 includes a radially inwardly located arcuate segment 126 spaced radially outwardly of and in curved, overlying relationship to the radius of the outer circumference 106. Each gate element 124 further includes spaced side walls 128, 130 located in close spaced parallelism with the oppositely facing wall surfaces 132, 134 formed on adjacent ones of the stationary vanes 112 of the diffuser 18.

As best shown in FIG. 3, each gate element 124 further includes an axially inboard end 136 located in parallel relationship to the surface 110 and an axially outboard end 138 that is connected to a control rod 140 slidably supported within a bore 142 in the shroud 98 and a bore 144 is a support flange 146 whereby the rod 140 is guided for reciprocation between the position shown in solid line in FIG. 3 wherein the gate element 124 completely closes the divergent passage 118 or to a position wherein the gate element 124 is located within a recessed space 147 within the shroud 98 so as to locate the surface 136 flush with the surface 108 so that the passage 118 will be completely open between the inlet 120 to the outlet 122 thereof. Since passage 118 is either fully open or fully closed, air flow from the outer circumference 106 of the impeller 60 will flow at the same angular relationship into and out of each of the separate passages 118 so as to maintain a desired efficiency in converting velocity energy of air discharge from the impeller 66 to pressure energy at the outlet of each of the passages 118.

Each of the gate elements 124 is under the control of a two tier operator system 148 including a first control ring 150 and a second control ring 152 respectively located in overlying relationship to slots 154, 156 formed on opposite sides of each of the control rods 140 and at axially spaced points therealong. As seen in FIG. 3, the control ring 150 surrounds the control rods 140 radially outwardly thereof and the control ring 152 is located radially inwardly thereof. The control ring 150 includes an operating lug 158 thereon that can be connected to a suitable power source which, in accordance with a given application with specified space and desired results can be an air operator, hydraulic or electric motor as desired. Likewise, the ring 152 includes an operating lug 160 that can be connected to a like source of power.

Figure 8:
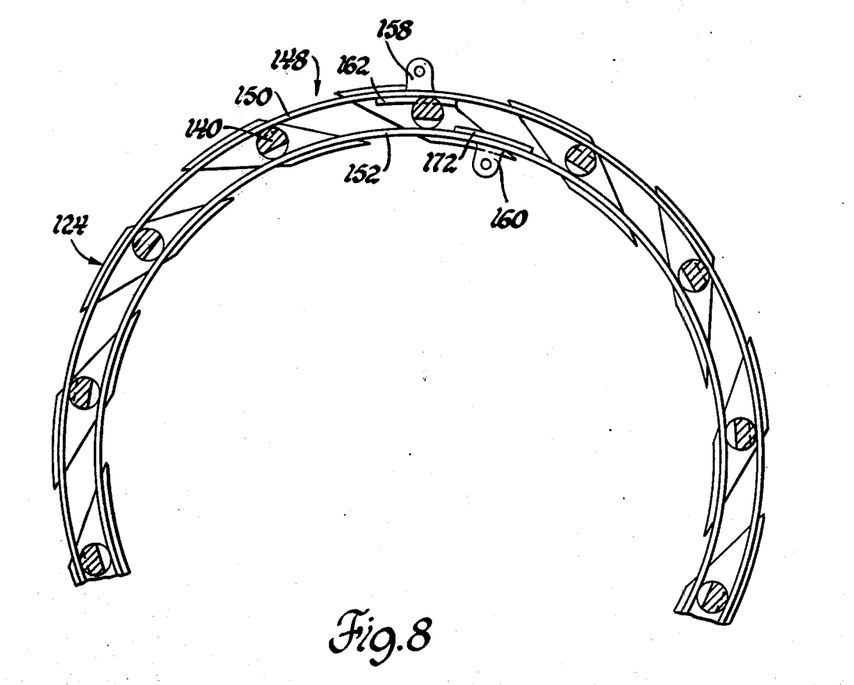
FIG. 8 is an end elevational view of a rod and cam ring control assembly for controlling the individual gates of a variable control for gas flow through individual diffuser passages of the diffuser in FIG. 3.

As the rings are rotated, linear cams on the inner surface of the outer ring 150 and on the outside of the inner ring 152 selectively enter the slots 154, 156 on each of the rods 140 to produce a desired schedule of flow area through the diffuser assembly 18. The use of two control rings is desired because of the high temperature gradients encountered in turbine applications. The ring 150 constitutes a gate closure ring and the ring 152 constitutes a gate opener. Combined, they produce a positive drive action to position each of the gate elements 124 in either a fully closed or a fully open position. As shown in FIG. 8, a plurality of spaced, linear cams 162 are formed on the ring 150. Each of them includes a ramp 164 driven with respect to an inboard surface 166 on each of the slots 154. Each cam 162 further includes an axial surface 168 thereon that engages an opposite surface 170 of the slot 154 when the linear cam 162 is in an engaged position within the slot 154.

The ring 152 includes a like plurality of spaced linear cams 172 each including a ramp 174 and an axial surface 176 respectively engageable with spaced end surfaces 178, 180 of each of the control slots 156.

Figure 9:
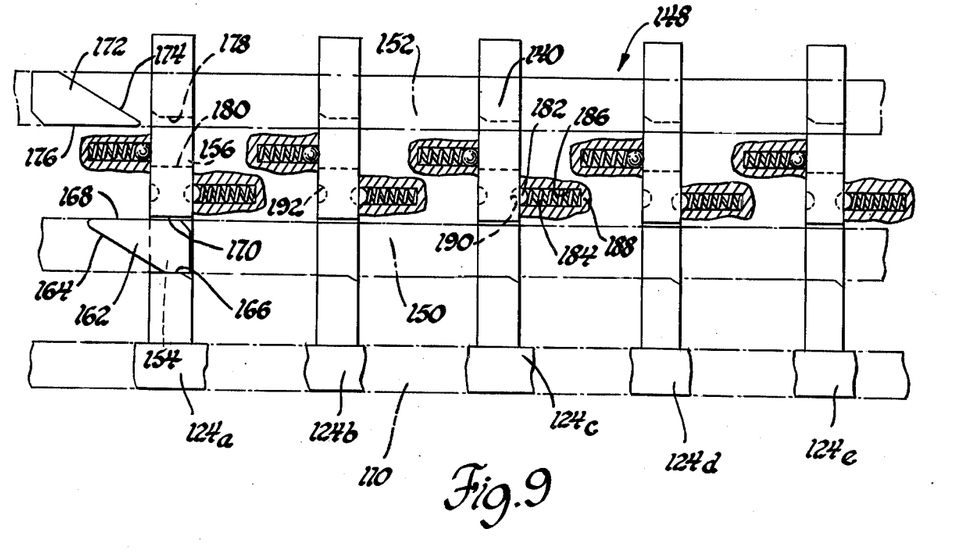
FIGS. 9 and 10 are developed views of the control gate and odd control of the opening and closing gate and associated control rods for individual valve gates of the type shown in FIGS. 5 and 6.

FIG. 9 shows five of the gates 124 all positioned closed (gates 124a-124e). The gates are held closed by location of a linear cam 162 in a slot 154 of one of the control rods 140. The intermediate gates 124b-124d have been previously closed by movement of the ring 150 so as to cause closure cams 162 to move the rods 140 of the gates 124c and 124d into a closed position with respect to the reference wall 110. At this point, a locater ball 182 is biased against rods 140 of each gate by a coil spring 184 located in a groove 186 of a support member 188 shown in FIG. 9. The ball is spring biased into a detent 190 formed on one side of the rod 140 as shown in FIG. 9 to hold the gates 124b-124e in their closed position. The opener cam 172 is between rods and approaching the slot 178 in the rod 140 of gate 124a as shown in FIG. 9. The closure cam 172 is engaged in the slot 154 of the rod 140 of gate 124a.

Figure 10:
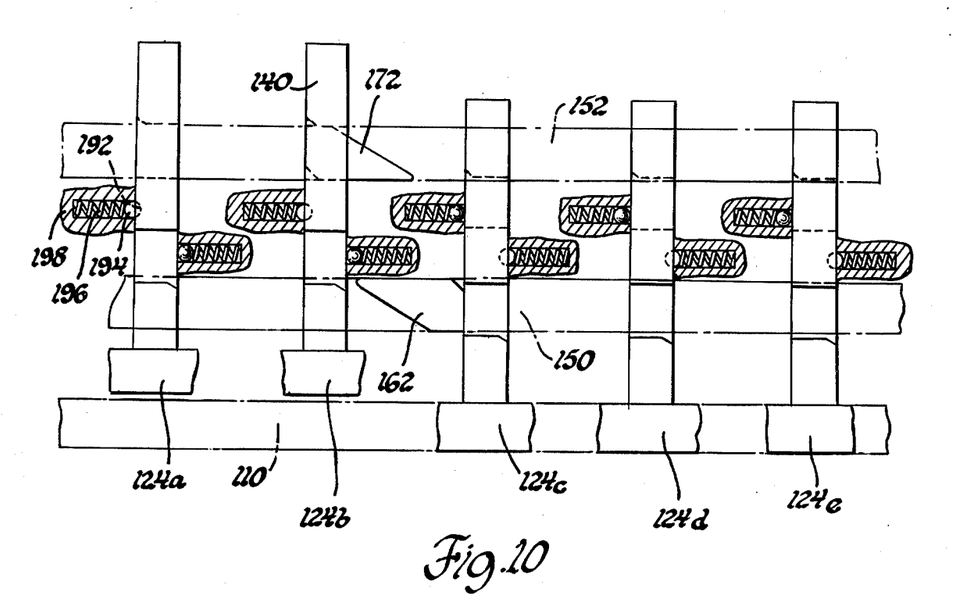

FIG. 10 shows the position of the cams 162, 172, respectively, when the control ring 152 has moved one and a half gates to the right as viewed in FIG. 10 and control ring 150 is moved to the left. Gate 124a is opened by passage of the opener cam 172 through slot 156. And the gate 124b is opened by the fact that opener cam 172 also enters slot 156 therein with the cam 162 remaining located in the slot 156. The closure cam 162 is moved from the slot 154 in rod 148 of gate 124a.

Open gates 124a, 124b have a rod detent 192 with a ball 194 located therein. In the illustrated arrangement the ball 194 is biased by a coil spring 196 located on a segment of a support ring 198 like the support ring 188 for supporting the ball 182 for biasingly retaining the gates in a closed position.

As the control ring 152 is moved in a rightward direction as viewed in FIG. 9, gates 124c, 124d, 124b will in turn be opened. To close each of the gates the control ring 150 direction of motion is reversed and the cam 164 will eventually close the gates individually and selectively one at a time.

In other arrangements where more than one gate at a time must be actuated, the ring can be modified to contain as many cams as the number of gates that are desired to be moved open and closed simultaneously so as to vary the step progression of area control as shown in FIG. 2 in region B of the control. In case where the number of opener and closure cams 172, 162 equals the total number of gates then the system can be operated as fully open or fully closed. The distance through which each of the control rings 150, 152 moves depends on the number of gates actuated at a given time.

If only one gate is actuated at a time as shown in FIGS. 9 and 10 each of the control rings must make one complete circle to actuate all of the gates. On the other hand, if all of the gates are actuated simultaneously then the number of control cams will equal the number of gates and the distance of ring movement is 360° divided by the total number of gates in the control assembly.

Figure 4:
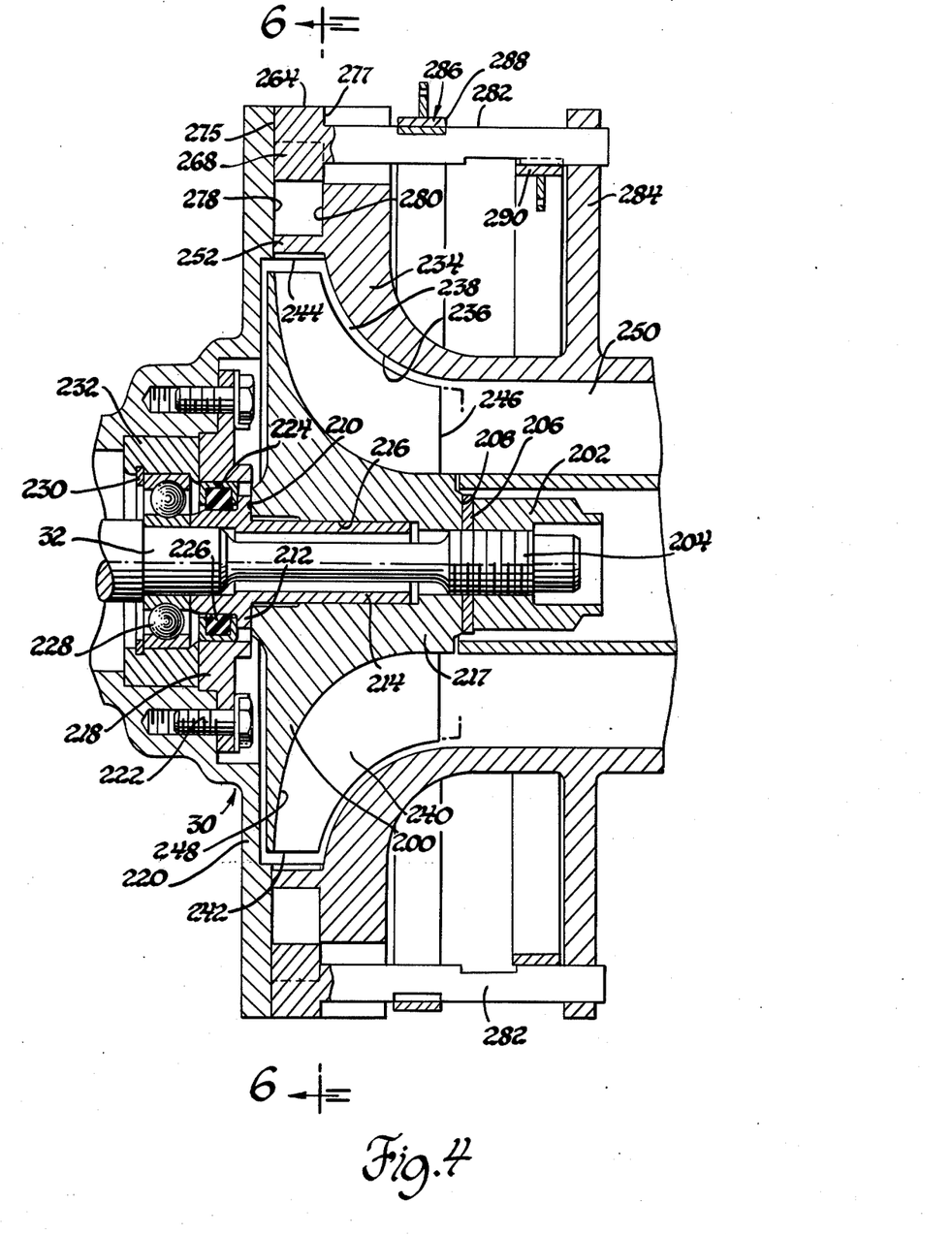
FIG. 4 is a vertical sectional view along the axis of a radial inflow turbine and turbine nozzle assembly of the present invention.

Referring now to FIG. 4, the radial inflow turbine 30 is illustrated with it being understood that the radial inflow turbine 38 has a corresponding configuration. The turbine 30 includes a radial inflow impeller 200 connected to the opposite end of the shaft 32 by means of a retainer nut 202 threadably received on a threaded end 204 thereof to hold a lock washer 206 against the front end 208 of the impeller 200.

The rear face 210 of the impeller 200 is held against a flange 212 of a bushing 214 press fit in a bore 216 in hub 217. A seal and bearing cover 218 is secured to a back plate 220 of the turbine 30 by means of a plurality of screws 222. Bore 224 in cover 218 receives a seal assembly 226 for sealing the outer periphery of the bushing 214. A bearing assembly 228 is held in place by means of a lock ring 230 in support ring 232 for rotatably supporting the shaft 32 with respect to the plate 220. The turbine further includes a cover shroud 234 having an annular curved inner surface 236 cooperating with the back plate 220 to define a working chamber 238 for the impeller 200.

The impeller includes a plurality of radially outwardly directed, circumferentially spaced blades 240 thereon each having an inlet edge 242 located radially inwardly of the inner circumference 244 of the variable flow capacity turbine nozzle assembly 28. Each of the blades 240 further includes an outlet 246. A turbine flow passage 248 is provided between each of the blades for receiving motive fluid from the variable flow capacity turbine nozzle assembly 28.

Energy from the motive fluid is utilized to drive the turbine impeller 200 and is then discharged through an annular passage 250 to the interstage diffuser 34 shown in FIG. 1.

The variable flow capacity turbine nozzle 28 includes a plurality of fixed nozzle vanes 252 each having an airfoil configuration and including a curved inlet end 254 and a trailing edge portion 256. A convexly configured curved surface 258 is located on the pressure side of each blade 252 and a concavely configured curved surface 260 is located on the low pressure side of each vane 252. A convergent flow passage 262 is located between each of the vanes 252. It includes an inlet 264 and an outlet 266 for receiving combustion products from the burner assembly 24 for flow against the blades 240 of the impeller to produce the motive power for the shaft 32. Each of the passages 262 includes a separate and individual nozzle flow control gate 268 having an outer circumferential wall 270 and an inner circumferential wall 272 joined by radially outwardly directed spaced side walls 274, 276.

Each gate 268 also includes spaced axial end surfaces 275, 277 having a width therebetween corresponding to the width of the passage 262 between an end plate reference surface 278 and an axially spaced reference surface 280 on the cover 234 as shown in FIG. 4. Each gate has a control rod 282 connected thereto that is slidably supported by a member 284 at one end thereof and associated with a ring and linear cam actuating assembly 286 corresponding to the ring and cam actuator for operating the compressor gate elements 124.

As the flow area through the compressor passages 118 are reduced to produce a step area control of the type shown in FIG. 2 a like control of the rings 288, 290 will produce a like change in the gas flow area through the variable flow capacity turbine nozzle assembly 28.

The power turbine 38 and its associated variable flow capacity turbine nozzle assembly 36 are configured like the details of the gasifier turbine 30 and its variable flow capacity turbine nozzle assembly 28, respectively, and repeat details are accordingly omitted.

Use of individual gates that are either fully opened or closed with respect to a radial flow passage in either the diffuser or nozzle assembly of a radial type turbomachinery eliminates the need for varying the angular relationship of control vanes with respect to such passageways and thus eliminates losses in efficiency due to changes in the angle of incidence of the gas flow into the nozzle or diffuser passages. Furthermore, the provision of individual gate elements that are moved totally into or completely out of the flow passages as shown in the prior described centrifugal compressor and radial inflow turbine assemblies eliminates abrupt changes in direction of flow from the centrifugal impeller in the case of the compressor into a diffuser assembly and from a nozzle assembly into the radial outer circumference of a radially bladed turbine impeller for extracting power from motive fluid directed therethrough.

The individual gates in both the diffuser and nozzle assemblies enable a step flow area control to be obtained, the step change in area is somewhat continuously variable so that the turbine inlet temperature can be held substantially constant within region B of FIG. 2 while it will vary in regions A and C.

It is contemplated that substantial increases in fuel economy for gas turbine engines are possible by use of the present invention. In the case of recuperated, variable flow area engines, it is believed that peak fuel economy in the order of fifty miles per gallon is obtainable as compared to a peak fuel economy in the order of thirty-five mile per gallon in engines of the type using split compressors of the type set forth in U.S. Pat. No. 3,625,003, issued Dec. 7, 1971, to applicants of this application. For a regenerated gas turbine engine of the type set forth in FIG. 1 the peak fuel economy for the variable flow area engine is 44.5 miles per gallon as compared to 41 miles per gallon for a comparable split compressor engine of the type set forth in U.S. Pat. No. 3,625,003. The reduced improvement in economy in the regenerator engine is due to regenerator leakage which in a conventional gas turbine engine is a small percentage of the total flow. However, in the variable flow area engine at low vehicle speed, where flow area is reduced to 10% of full design flow area through both diffusers and nozzles components of the system, such regenerator leakage becomes a significant fraction of the total flow and will materially affect fuel economy of the engine. At higher engine vehicle speeds, for example, those above forty miles per hour, the regenerated engine has better fuel economy than does recuperated engine therefore explaining the relatively like high economy characteristics of both the recuperated and regenerated type of gas type turbine engine.

In summary, the invention is readily adapted to a wide range of radial flow turbomachinery to substantially reduce and/or vary the flow area through the diffuser and/or nozzle of the engine. In particular, the arrangement is capable of reducing air flow to the turbine engine at least 10% of the design area thereof while incorporating variable area turbine nozzles plus a control system of simple ring actuators and linear cams to change both of the compressor diffuser areas and turbine nozzle flow areas at the same time as a function of vehicle power demand as set forth in FIG. 2.

The resultant effect of the inventive concept as applied to the turbomachines illustrated, enables a performance equivalent to several small engines — perhaps ten or more — combined into a single package with only a small number of the engines being required for part load phases of operation and with more of the engine being placed onstream, merely by opening or closing given ones of the individual flow gates of the diffuser and nozzle assemblies in accordance with changes in the ranges of power levels demanded by operation of an accelerator by the driver of the vehicle.

While the embodiments of the present invention, as herein disclosed, constitute a preferred form, it is to be understood that other forms might be adopted.

The embodiments of the invention in which an exclusive property or privilege is claimed are defined as follows:

1. A method for controlling a road vehicle turbine engine operation wherein the engine includes a fuel supply, combustor and a radial compressor with a variable area discharge diffuser and a radial inflow turbine having a variable area inlet nozzle comprising the steps of maintaining constant gas flow area through both the discharge diffuser and inlet nozzle at a preset percent of the full open area therethrough at vehicle road speeds of from zero to some lower predetermined speed while controlling fuel supply to increase engine speed, thereafter simultaneously increasing both the flow area of the diffuser and the flow area of the nozzle under part load conditions as a function of vehicle power demand at road speeds of from the lower predetermined speed to some upper road predetermined speed while controlling fuel supply to simultaneously maintain a constant engine speed of operation, and controlling fuel flow to increased levels at vehicle road speeds above said upper predetermined road speed while fully opening both said diffuser and said nozzle to produce a variable turbine inlet temperature to increase the engine speed in accordance with load demand.

2. A method for controlling a road vehicle turbine engine operation wherein the engine includes a fuel supply, combustor and a radial compressor with a variable area discharge diffuser and a radial inflow turbine having a variable area inlet nozzle comprising the steps of maintaining constant gas flow area through both the discharge diffuser and inlet nozzle at some predetermined fraction of the full open area therethrough at vehicle road speeds of from zero to a lower predetermined road speed while controlling fuel supply to increase engine speed, simultaneously increasing both the flow area of the diffuser and the flow area of the nozzle in a finite number of steps under part load conditions as a function of vehicle power demand at road speeds of from said lower predetermined speed to some upper predetermined road speed and controlling fuel flow to increased levels at vehicle speeds above said upper predetermined road speed while fully opening both said diffuser and said nozzle to produce a variable turbine inlet temperature to increase the engine speed in accordance with load demand.

* * * * *